United States Patent
Chen (10) Patent No.: US 12,519,389 B1
(45) Date of Patent: Jan. 6, 2026

(54) CHARGE PUMP DEVICE (71) Applicant: ELITE SEMICONDUCTOR MICROELECTRONICS TECHNOLOGY INC., Hsinchu (TW)

(72) Inventor: Isaac Y. Chen, Hsinchu (TW)

(73) Assignee: ELITE SEMICONDUCTOR MICROELECTRONICS TECHNOLOGY INC., Hsinchu (TW)

( * ) Notice: Subject to any disclaimer, the term of this patent is extended or adjusted under 35 U.S.C. 154(b) by 50 days.

(21) Appl. No.: 18/764,109

(22) Filed: Jul. 3, 2024

(51) Int. Cl.
*H02M 3/07* (2006.01)
*H02M 1/00* (2006.01)

(52) U.S. Cl.
CPC ............. *H02M 3/07* (2013.01); *H02M 1/009* (2021.05)

(58) Field of Classification Search
None
See application file for complete search history.

(56) References Cited

U.S. PATENT DOCUMENTS

| | | | |
|---|---|---|---|
| 5,306,954 A | 4/1994 | Chan et al. | |
| 7,427,889 B2 * | 9/2008 | Lin | H02M 3/07 363/59 |
| 10,148,171 B2 | 12/2018 | Nguyen et al. | |
| 10,560,034 B2 * | 2/2020 | Paulos | H02M 7/103 |
| 12,034,368 B1 * | 7/2024 | Tian | H02M 1/0045 |

* cited by examiner

*Primary Examiner* — Jeffrey S Zweizig (57) ABSTRACT

A charge pump device includes a voltage adjustment unit, an output capacitor, a first output unit and a second output unit. The voltage adjustment unit performs voltage pumping or voltage reducing operation on a power supply voltage according to first to fourth control signals, a positive pump voltage and an negative pump voltage to generate a first voltage adjustment output and a second voltage adjustment output at a first node and a second node respectively. The output capacitor has a first output terminal and a second output terminal. When the first output unit is turned on, the first voltage adjustment output charges the output capacitor through the first output unit, so that the first output terminal generates the positive pump voltage. When the second output unit is turned on, the second voltage adjustment output charges the output capacitor through the second output unit, so that the second output terminal generates the negative pump voltage. When the first output unit is turned on, the second output unit is not turned on. When the second output unit is turned on, the first output unit is not turned on.

20 Claims, 7 Drawing Sheets

CHARGE PUMP DEVICE

BACKGROUND OF THE INVENTION

1. Field of the Invention

The present disclosure relates to devices, and in particular to a charge pump device.

2. Description of the Related Art

A charge pump is a DC-to-DC converter and uses a capacitor for serving as an energy-storing component to generate an output voltage higher than or lower than an input voltage. Each charge pump can only output positive pump voltage or output negative pump voltage. It is impossible for the same charge pump to output positive pump voltage or negative pump voltage. As a result, it is necessary for a charge pump device to comprises a positive charge pump (for generating positive pump voltage) and a negative charge pump (for generating negative pump voltage). The positive charge pump and negative charge pump each comprise a flying capacitor, an output capacitor and any required components; as a result, the charge pump device comprises multiple flying capacitors and multiple output capacitors, leading to large circuit area, high manufacturing cost, and more output pins. In addition, a conventional primary the charge pump device generates an output voltage that is around two times an input voltage. For example, given an input voltage of 2.7V~4.2V, at least a tertiary charge pump device is required for generating an output for use in a 18V system, resulting in an increase in the manufacturing cost.

BRIEF SUMMARY OF THE INVENTION

In view of the aforesaid drawbacks of the prior art, it is an objective of the disclosure to provide a charge pump device having minimal required circuit area, manufacturing cost, and number of output pins and generating an output voltage that is around three times of a power supply (input) voltage so as to overcome a drawback of the prior art: conventional charge pump devices having large required circuit area, incurring high manufacturing cost, requiring a large number of output pins and generating an output voltage that is only around two times of the input voltage.

To achieve the above and other objectives, the disclosure provides a charge pump device comprising a voltage adjustment unit, an output capacitor unit, a first output unit and a second output unit.

The voltage adjustment unit has a first node and a second node, receives a power supply voltage, a first control signal, a second control signal, a third control signal, a fourth control signal, a positive pump voltage and a negative pump voltage, and performs a voltage pumping operation or a voltage reducing operation on the power supply voltage according to the first through fourth control signals, the positive pump voltage and the negative pump voltage to generate a first voltage adjustment output at the first node and generate a second voltage adjustment output at the second node.

The output capacitor unit has a first output terminal and a second output terminal.

The first output unit is coupled between the first node and the first output terminal. When the first output unit is ON, the first voltage adjustment output charges the output capacitor unit through the first output unit, causing the first output terminal of the output capacitor unit to generate the positive pump voltage.

The second output unit is coupled between the second node and the second output terminal. When the second output unit is ON, the second voltage adjustment output charges the output capacitor unit through the second output unit, causing the second output terminal of the output capacitor unit to generate the negative pump voltage.

The second output unit is OFF when the first output unit is ON, and the first output unit is OFF when the second output unit is ON.

Regarding the charge pump device in an embodiment of the disclosure, the voltage adjustment unit comprises: a first switch circuit adapted to receive the power supply voltage, the first control signal, the second control signal and the positive pump voltage and coupled to the first node to perform switching according to the first control signal, the second control signal and the positive pump voltage to perform the voltage pumping operation or the voltage reducing operation, so as to generate the first voltage adjustment output at the first node; a second switch circuit adapted to receive the power supply voltage, the third control signal, the fourth control signal and the negative pump voltage and coupled to the second node to perform switching according to the third control signal, the fourth control signal and the negative pump voltage to perform the voltage pumping operation or the voltage reducing operation, so as to generate the second voltage adjustment output at the second node; and a flying capacitor coupled between the first node and the second node to perform charging according to one of the first voltage adjustment output and the second voltage adjustment output.

Regarding the charge pump device in an embodiment of the disclosure, the voltage pumping operation comprises a precharging stage and a voltage pumping stage, whereas the voltage reducing operation comprises a predischarging stage and a voltage reducing stage, with the first switch circuit comprising: a first buffer gate having a first end for receiving the first control signal, a second end for receiving the positive pump voltage, a third end for receiving a reference voltage, and a first buffer output terminal and adapted to generate a first buffer signal at the first buffer output terminal according to the first control signal, the positive pump voltage and the reference voltage; a first transistor having a first end for receiving the power supply voltage, a second end coupled to the first node, and a control end coupled to the first buffer output terminal to receive the first buffer signal so as for the first transistor to be controlled by the first buffer signal to turn ON or OFF; a first parasitic diode and a first diode, coupled between the first end and the second end of the first transistor, the first parasitic diode having a cathode coupled to a cathode of the first diode and having an anode coupled to the second end of the first transistor, and the first diode having an anode coupled to the first end of the first transistor; a second buffer gate having a first end for receiving the second control signal, a second end for receiving the power supply voltage, a third end for receiving the reference voltage, and a second buffer output terminal and adapted to generate a second buffer signal at the second buffer output terminal according to the second control signal, the power supply voltage and the reference voltage; and a second transistor having a first end coupled to the second end of the first transistor, a second end for receiving the reference voltage, and a control end coupled to the second buffer output terminal to receive the second buffer signal so as for the second transistor to be controlled by the second buffer signal to turn ON or OFF. In the precharging stage, the first transistor is ON, whereas the second transistor, the first output unit and the second output unit are OFF. In the voltage pumping stage, the first transistor, the second transistor and the second output unit are OFF, whereas the first output unit is ON. In the predischarging stage, the first transistor is ON, whereas the second transistor, the first output unit and the second output unit are OFF. In the voltage reducing stage, the first transistor and the first output unit are OFF, whereas the second transistor and the second output unit are ON.

Regarding the charge pump device in an embodiment of the disclosure, the first switch circuit further comprises: a first voltage-dividing transistor having a first end coupled to the second end of the first transistor, a second end coupled to the first end of the second transistor, and a control end for receiving the power supply voltage so as for the first voltage-dividing transistor to be controlled by the power supply voltage to turn ON or OFF.

Regarding the charge pump device in an embodiment of the disclosure, the first transistor is a P-type MOSFET, whereas the second transistor and the first voltage-dividing transistor are each an N-type MOSFET.

Regarding the charge pump device in an embodiment of the disclosure, the voltage pumping operation comprises a precharging stage and a voltage pumping stage, whereas the voltage reducing operation comprises a predischarging stage and a voltage reducing stage, with the second switch circuit comprising: a third buffer gate having a first end for receiving the third control signal, a second end for receiving the power supply voltage, a third end for receiving the reference voltage, and a third buffer output terminal and adapted to generate a third buffer signal at the third buffer output terminal according to the third control signal, the power supply voltage and the reference voltage; a third transistor having a first end for receiving the power supply voltage, a second end coupled to the second node, and a control end coupled to the third buffer output terminal to receive the third buffer signal so as for the third transistor to be controlled by the third buffer signal to turn ON or OFF; a fourth buffer gate having a first end for receiving the fourth control signal, a second end for receiving the power supply voltage, a third end for receiving the negative pump voltage, and a fourth buffer output terminal and adapted to generate a fourth buffer signal at the fourth buffer output terminal according to the fourth control signal, the power supply voltage and the negative pump voltage; a fourth transistor having a first end coupled to the second end of the third transistor, a second end for receiving the reference voltage, and a control end coupled to the fourth buffer output terminal to receive the fourth buffer signal so as for the fourth transistor to be controlled by the fourth buffer signal to turn ON or OFF; and a second parasitic diode and a second diode, coupled between the first end and the second end of the fourth transistor, the second parasitic diode having an anode coupled to an anode of the second diode and having a cathode coupled to the first end of the fourth transistor, and the second diode having a cathode coupled to the second end of the fourth transistor. In the precharging stage, the fourth transistor is ON, whereas the third transistor, the first output unit and the second output unit are OFF. In the voltage pumping stage, the fourth transistor and the second output unit are OFF, whereas the third transistor and the first output unit are ON. In the predischarging stage, the fourth transistor is ON, whereas the third transistor, the first output unit and the second output unit are OFF. In the voltage reducing stage, the fourth transistor, the third transistor and the first output unit are OFF, whereas the second output unit is ON.

Regarding the charge pump device in an embodiment of the disclosure, the second switch circuit further comprises a second voltage-dividing transistor having a first end coupled to the second end of the third transistor, a second end coupled to the first end of the fourth transistor, and a control end for receiving the reference voltage so as for the second voltage-dividing transistor to be controlled by the reference voltage to turn ON or OFF.

Regarding the charge pump device in an embodiment of the disclosure, the third transistor and the second voltage-dividing transistor are each a P-type MOSFET, and the fourth transistor is an N-type MOSFET.

Regarding the charge pump device in an embodiment of the disclosure, when the reference voltage is a grounded voltage, the positive pump voltage is around two times the power supply voltage, and the negative pump voltage is substantially a reverse power supply voltage.

The charge pump device in an embodiment of the disclosure further comprises: a negative charge pump coupled to the voltage adjustment unit, the first output unit and the second output unit to generate the reference voltage according to the power supply voltage and output the reference voltage to the voltage adjustment unit, the first output unit and the second output unit, with the reference voltage being a reverse power supply voltage, allowing the positive pump voltage to be around three times the power supply voltage, and allowing the negative pump voltage to be around three times the reverse power supply voltage.

Regarding the charge pump device in an embodiment of the disclosure, the first output unit selectively turns ON according to the first voltage adjustment output and comprises a first output diode having an anode coupled to the first node to receive the first voltage adjustment output and a cathode coupled to the first output terminal of the output capacitor unit.

Regarding the charge pump device in an embodiment of the disclosure, the first output unit comprises: a fifth buffer gate having a first end for receiving a fifth control signal, a second end for receiving the positive pump voltage, a third end for receiving a reference voltage, and a fifth buffer output terminal and adapted to generate a fifth buffer signal at the fifth buffer output terminal according to the fifth control signal, the positive pump voltage and the reference voltage; and a fifth transistor having a first end coupled to the first node to receive the first voltage adjustment output, a second end coupled to the first output terminal of the output capacitor unit, and a control end coupled to the fifth buffer output terminal to receive the fifth buffer signal so as for the fifth transistor to be controlled by the fifth buffer signal to turn ON or OFF.

Regarding the charge pump device in an embodiment of the disclosure, the first output unit further comprises a third voltage-dividing transistor having a first end coupled to the first node to receive the first voltage adjustment output, a second end coupled to the first end of the fifth transistor, and a control end coupled to the fifth buffer output terminal to receive the fifth buffer signal so as for the third voltage-dividing transistor to be controlled by the fifth buffer signal to turn ON or OFF.

Regarding the charge pump device in an embodiment of the disclosure, the fifth transistor and the third voltage-dividing transistor are each a P-type MOSFET.

Regarding the charge pump device in an embodiment of the disclosure, the second output unit selectively turns ON according to the second voltage adjustment output and comprises a second output diode having an anode coupled to the second node to receive the second voltage adjustment output and a cathode coupled to the second output terminal of the output capacitor unit.

Regarding the charge pump device in an embodiment of the disclosure, the second output unit comprises: a sixth buffer gate having a first end for receiving a sixth control signal, a second end for receiving the power supply voltage, a third end for receiving the negative pump voltage, and a sixth buffer output terminal and adapted to generate a sixth buffer signal at the sixth buffer output terminal according to the sixth control signal, the power supply voltage and the negative pump voltage; and a sixth transistor having a first end coupled to the second node to receive the second voltage adjustment output, a second end coupled to the second output terminal of the output capacitor unit, and a control end coupled to the sixth buffer output terminal to receive the sixth buffer signal so as for the sixth transistor to be controlled by the sixth buffer signal to turn ON or OFF.

Regarding the charge pump device in an embodiment of the disclosure, the second output unit further comprises: a fourth voltage-dividing transistor having a first end coupled to the second node to receive the second voltage adjustment output, a second end coupled to the first end of the sixth transistor, and a control end coupled to the sixth buffer output terminal to receive the sixth buffer signal so as for the fourth voltage-dividing transistor to be controlled by the sixth buffer signal to turn ON or OFF.

Regarding the charge pump device in an embodiment of the disclosure, the sixth transistor and the fourth voltage-dividing transistor are each an N-type MOSFET.

The charge pump device in an embodiment of the disclosure further comprises a phase control circuit coupled to the voltage adjustment unit to generate the first through fourth control signals and output the first through fourth control signals to the voltage adjustment unit.

The charge pump device in an embodiment of the disclosure further comprises: a first voltage-stabilizing capacitor having a first end for receiving the power supply voltage and a second end coupled to the first output terminal of the output capacitor unit; a third diode having an anode for receiving the power supply voltage and a cathode coupled to the first output terminal of the output capacitor unit; a second voltage-stabilizing capacitor having a first end coupled to the second output terminal of the output capacitor unit and a grounded second end; and a fourth diode having an anode coupled to the second output terminal of the output capacitor unit and a grounded cathode.

The charge pump device of the disclosure has advantages summarized below. The second output unit is OFF when the first output unit is ON, whereas the first output unit is OFF when the second output unit is ON; thus, the charge pump device of the disclosure can generate the positive pump voltage or the negative pump voltage to thereby enhance the flexibility of the charge pump device. Compared with the prior art, the charge pump device of the disclosure is further advantageous in that its output capacitor unit and flying capacitor are each in the number of one, minimizing the required circuit area, manufacturing cost, and number of output pins.

BRIEF DESCRIPTION OF THE DRAWINGS

The other features and advantages of the disclosure are clearly presented in embodiments depicted by accompanying drawings.

DETAILED DESCRIPTION OF THE INVENTION

Objectives, features, and advantages of the disclosure are herein illustrated with embodiments, depicted with accompanying drawings, and described below. Furthermore, the terms "comprise" and "include" used below and in the claims are open-ended and thus must not be interpreted as a closed-ended jargon, such as "consist of". Moreover, the jargon "coupled to" is intended to mean "indirectly or directly coupled to". Thus, if an apparatus is coupled to another apparatus, the connection is achieved by coupling the apparatuses together directly or achieved by coupling the apparatuses together indirectly through any other apparatus. Ordinal numbers, such as "first", "second" and "third" used herein are intended to differentiate components from each other instead of placing limitations on the components themselves or indicating specific sequence of the components. Similar components in different embodiments are denoted by identical reference numerals.

Figure 1:
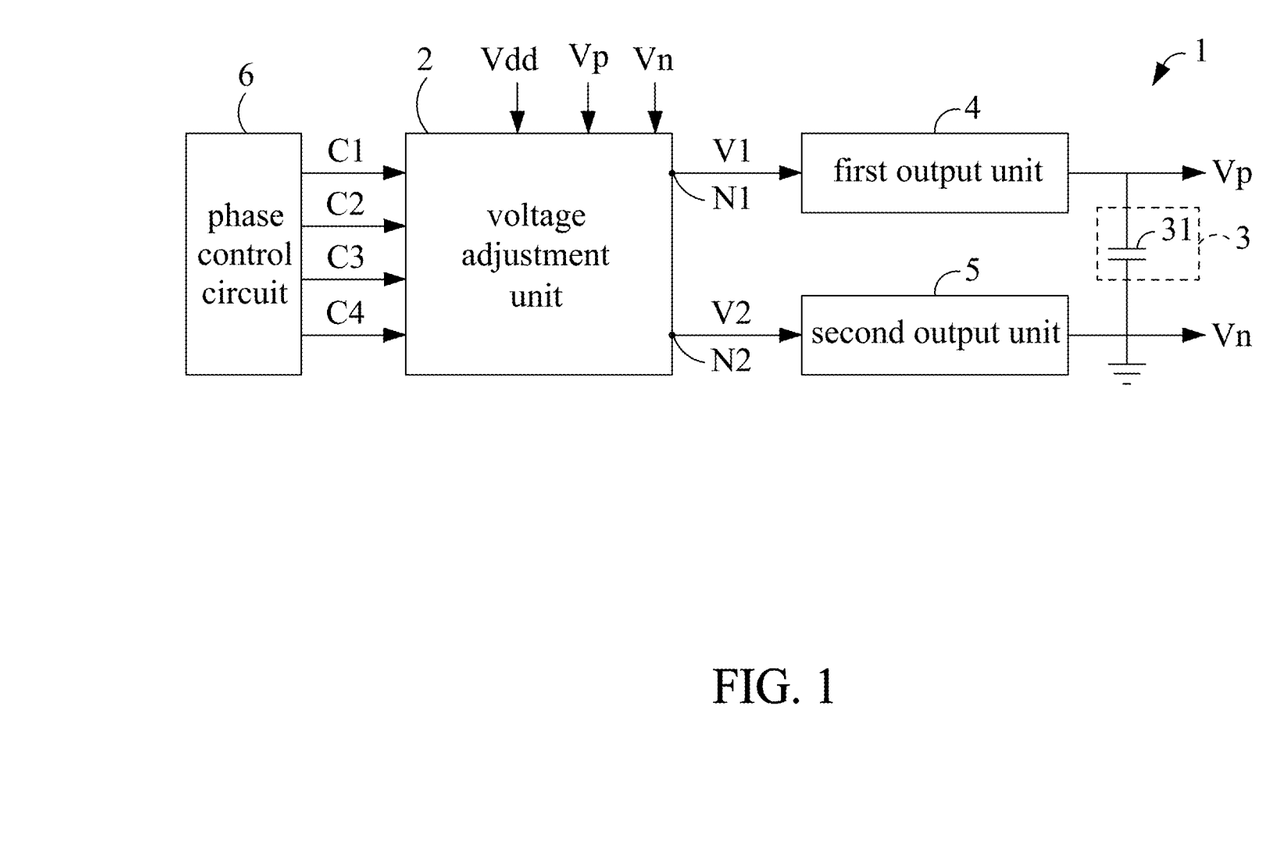
FIG. 1 is a circuit block diagram of a charge pump device according to an embodiment of the disclosure.

Referring to FIG. 1, there is shown a circuit block diagram of a charge pump device 1 according to an embodiment of the disclosure. The charge pump device 1 can generate a high-voltage, low-current output and thus is applicable to microelectromechanical systems (MEMS) or piezoelectric loudspeakers. The charge pump device 1 comprises a voltage adjustment unit 2, an output capacitor unit 3, a first output unit 4, a second output unit 5 and a phase control circuit 6. In this embodiment, the charge pump device 1 is a primary charge pump device.

The phase control circuit 6 is coupled to the voltage adjustment unit 2 and adapted to generate a first control signal C1, a second control signal C2, a third control signal C3 and a fourth control signal C4 for controlling the ON state and OFF state of transistors (described in detail below) inside the voltage adjustment unit 2. The configuration and operation of the phase control circuit 6 is well known among persons skilled in the art and thus is, for the sake of brevity, not reiterated.

The voltage adjustment unit 2 has a first node N1 and a second node N2, receives a power supply voltage Vdd, the first through fourth control signals C1~C4, a positive pump voltage Vp and a negative pump voltage Vn, and performs voltage pumping or voltage reducing operation on the power supply voltage Vdd according to the first through fourth control signals C1~C4, the positive pump voltage Vp and the negative pump voltage Vn to generate a first voltage adjustment output V1 at the first node N1 and generate a second voltage adjustment output V2 at the second node N2. The power supply voltage Vdd is a voltage source (not shown) from an external system.

The output capacitor unit 3 has a first output terminal and a second output terminal. In this embodiment, the output capacitor unit 3 comprises an output capacitor 31 coupled between the first output terminal and the second output terminal, but the disclosure is not limited thereto. In a variant embodiment, the output capacitor unit 3 comprises two output capacitors connected in series and coupled between the first output terminal and the second output terminal.

The first output unit 4 is coupled between the first node N1 and the first output terminal of the output capacitor unit 3. When the first output unit 4 is ON, the first voltage adjustment output V1 charges the output capacitor unit 3 through the first output unit 4, causing the first output terminal of the output capacitor unit 3 to generate the positive pump voltage Vp.

The second output unit 5 is coupled between the second node N2 and the second output terminal of the output capacitor unit 3. When the second output unit 5 is ON, the second voltage adjustment output V2 charges the output capacitor unit 3 through the second output unit 5, causing the second output terminal of the output capacitor unit 3 to generate the negative pump voltage Vn.

In this embodiment, the second output unit 5 is OFF when the first output unit 4 is ON, and the first output unit 4 is OFF when the second output unit 5 is ON, allowing the charge pump device 1 to generate the positive pump voltage Vp or the negative pump voltage Vn and thereby enhance the flexibility of the use of the charge pump device.

Figure 2:
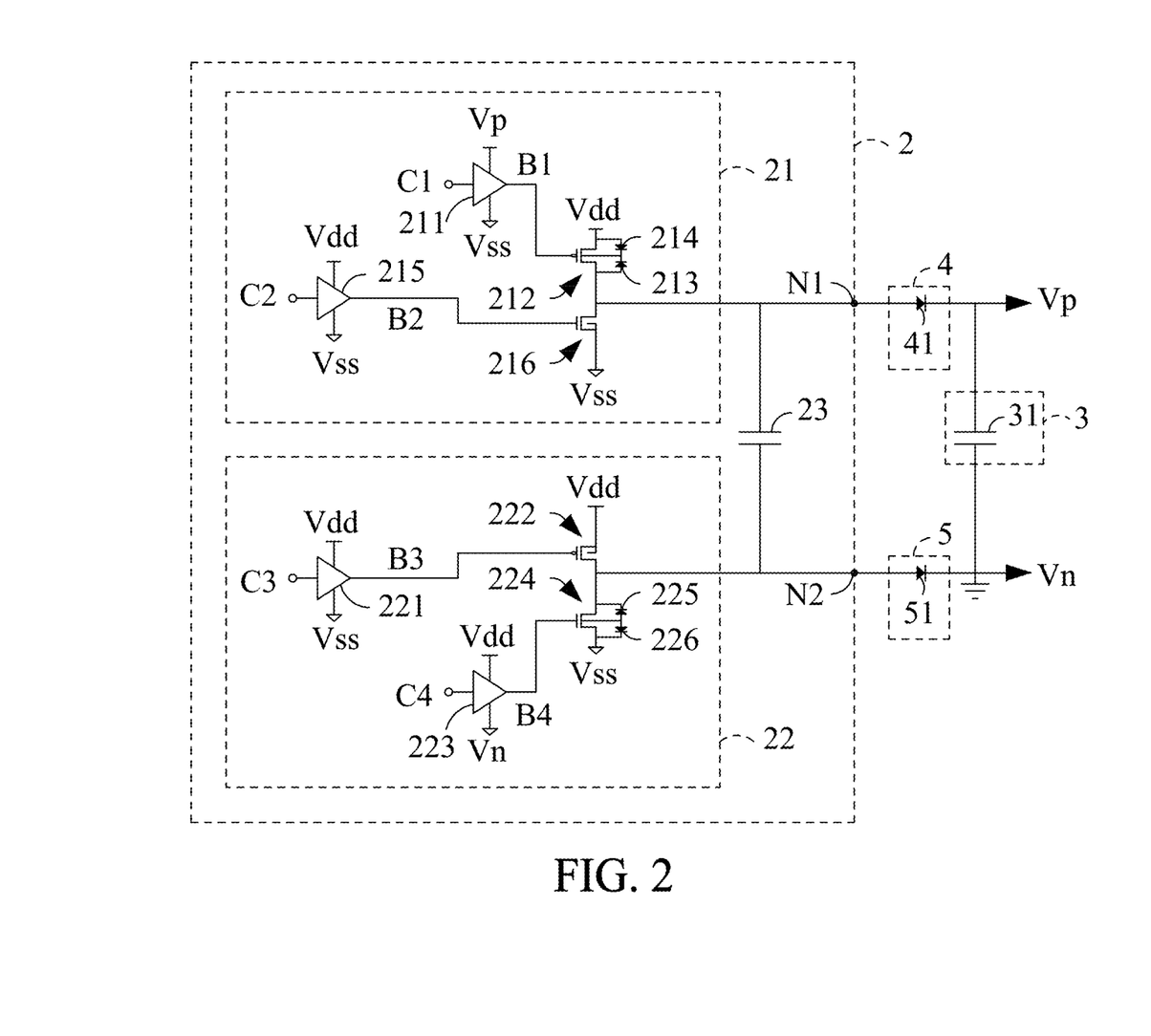
FIG. 2 is a circuit diagram of a voltage adjustment unit, a first output unit and a second output unit according to the embodiment of the disclosure.

Referring to FIG. 2, in this embodiment, the voltage adjustment unit 2 comprises a first switch circuit 21, a second switch circuit 22, and a flying capacitor 23.

The first switch circuit 21 is coupled between the phase control circuit 6 and the first node N1 and receives the power supply voltage Vdd, the positive pump voltage Vp as well as the first control signal C1 and the second control signal C2 from the phase control circuit 6. The first switch circuit 21 performs switching to generate the first voltage adjustment output V1 at the first node N1 according to the first control signal C1, the second control signal C2 and the positive pump voltage Vp. In this embodiment, the first switch circuit 21 comprises a first buffer gate 211, a first transistor 212, a first parasitic diode 213, a first diode 214, a second buffer gate 215 and a second transistor 216.

The first buffer gate 211 has a first end for receiving the first control signal C1, a second end for receiving the positive pump voltage Vp, a third end for receiving a reference voltage Vss, and a first buffer output terminal. The first buffer gate 211 generates a first buffer signal B1 at the first buffer output terminal according to the first control signal C1, the positive pump voltage Vp and the reference voltage Vss.

The first transistor 212 has a first end for receiving the power supply voltage Vdd, a second end coupled to the first node N1, and a control end coupled to the first buffer output terminal to receive the first buffer signal B1. The first transistor 212 is controlled by the first buffer signal B1 to turn ON or OFF.

The first parasitic diode 213 and the first diode 214 are coupled between the first end and the second end of the first transistor 212. The cathode of the first parasitic diode 213 is coupled to the cathode of the first diode 214. The anode of the first parasitic diode 213 is coupled to the second end of the first transistor 212. The anode of the first diode 214 is coupled to the first end of the first transistor 212. The first diode 214 functions as a reverse current prevention component. When the first voltage adjustment output V1 is greater than the power supply voltage Vdd, the first node N1 is floating because of the first diode 214, preventing any current from the first node N1 from flowing into the voltage source outside the charge pump device 1 via the first parasitic diode 213.

The second buffer gate 215 has a first end for receiving the second control signal C2, a second end for receiving the power supply voltage Vdd, a third end for receiving the reference voltage Vss, and a second buffer output terminal. The second buffer gate 215 generates a second buffer signal B2 at the second buffer output terminal according to the second control signal C2, the power supply voltage Vdd and the reference voltage Vss.

The second transistor 216 has a first end coupled to the second end of the first transistor 212, a second end for receiving the reference voltage Vss, and a control end coupled to the second buffer output terminal to receive the second buffer signal B2. The second transistor 216 is controlled by the second buffer signal B2 to turn ON or OFF.

The second switch circuit 22 is coupled between the phase control circuit 6 and the second node N2 and receives the power supply voltage Vdd, the negative pump voltage Vn as well as the third control signal C3 and the fourth control signal C4 from the phase control circuit 6. The second switch circuit 22 performs switching according to the third control signal C3, the fourth control signal C4 and the negative pump voltage Vn to generate the second voltage adjustment output V2 at the second node N2. In this embodiment, the second switch circuit 22 comprises a third buffer gate 221, a third transistor 222, a fourth buffer gate 223, a fourth transistor 224, a second parasitic diode 225 and a second diode 226.

The third buffer gate 221 has a first end for receiving the third control signal C3, a second end for receiving the power supply voltage Vdd, a third end for receiving the reference voltage Vss, and a third buffer output terminal. The third buffer gate 221 generates a third buffer signal B3 at the third buffer output terminal according to the third control signal C3, the power supply voltage Vdd and the reference voltage Vss.

The third transistor 222 has a first end for receiving the power supply voltage Vdd, a second end coupled to the second node N2, and a control end coupled to the third buffer output terminal to receive the third buffer signal B3. The third transistor 222 is controlled by the third buffer signal B3 to turn ON or OFF.

The fourth buffer gate 223 has a first end for receiving the fourth control signal C4, a second end for receiving the power supply voltage Vdd, a third end for receiving the negative pump voltage Vn, and a fourth buffer output terminal. The fourth buffer gate 223 generates a fourth buffer signal B4 at the fourth buffer output terminal according to the fourth control signal C4, the power supply voltage Vdd and the negative pump voltage Vn.

The fourth transistor 224 has a first end coupled to the second end of the third transistor 222, a second end for receiving the reference voltage Vss, and a control end coupled to the fourth buffer output terminal to receive the fourth buffer signal B4. The fourth transistor 224 is controlled by the fourth buffer signal B4 to turn ON or OFF.

The second parasitic diode 225 and the second diode 226 are coupled between the first end and the second end of the fourth transistor 224. The anode of the second parasitic diode 225 is coupled to the anode of the second diode 226. The cathode of the second parasitic diode 225 is coupled to the first end of the fourth transistor 224. The cathode of the second diode 226 is coupled to the second end of the fourth transistor 224. The second diode 226 functions as a reverse current prevention component. When the second voltage adjustment output V2 is greater than the reference voltage Vss, the second node N2 is floating because of the second diode 226, preventing any current from the second node N2 from flowing into the voltage source outside the charge pump device 1 via the second parasitic diode 225.

The first transistor 212 and the third transistor 222 are each a P-type MOSFET whose source, drain and gate are the first end, second end and control end of each of the first transistor 212 and the third transistor 222 respectively. The second transistor 216 and the fourth transistor 224 are each an N-type MOSFET whose drain, source and gate are the first end, second end and control end of each of the second transistor 216 and the fourth transistor 224 respectively.

The flying capacitor 23 is coupled between the first node N1 and the second node N2 and performs charging according to the first voltage adjustment output V1 or the second voltage adjustment output V2.

The first output unit 4 selectively turns ON according to the first voltage adjustment output V1 and comprises a first output diode 41. The first output diode 41 has an anode coupled to the first node N1 to receive the first voltage adjustment output V1 and a cathode coupled to the first output terminal of the output capacitor unit 3. When the first voltage adjustment output V1 is a high-level voltage sufficient to cause the first output diode 41 to turn ON, the first voltage adjustment output V1 turns ON the first output diode 41; thus, the output capacitor unit 3 is charged by the first voltage adjustment output V1 stored in the flying capacitor 23, causing the first output terminal of the output capacitor unit 3 to generate the positive pump voltage Vp.

The second output unit 5 selectively turns ON according to the second voltage adjustment output V2 and comprises a second output diode 51. The second output diode 51 has an anode coupled to the second node N2 to receive the second voltage adjustment output V2 and a cathode coupled to the second output terminal of the output capacitor unit 3. When the second voltage adjustment output V2 is a high-level voltage sufficient to cause the second output diode 51 to turn ON, the second voltage adjustment output V2 turns ON the second output diode 51; thus, the output capacitor unit 3 is charged by the second voltage adjustment output V2 stored in the flying capacitor 23, causing the second output terminal of the output capacitor unit 3 to generate the negative pump voltage Vn.

Figure 3:
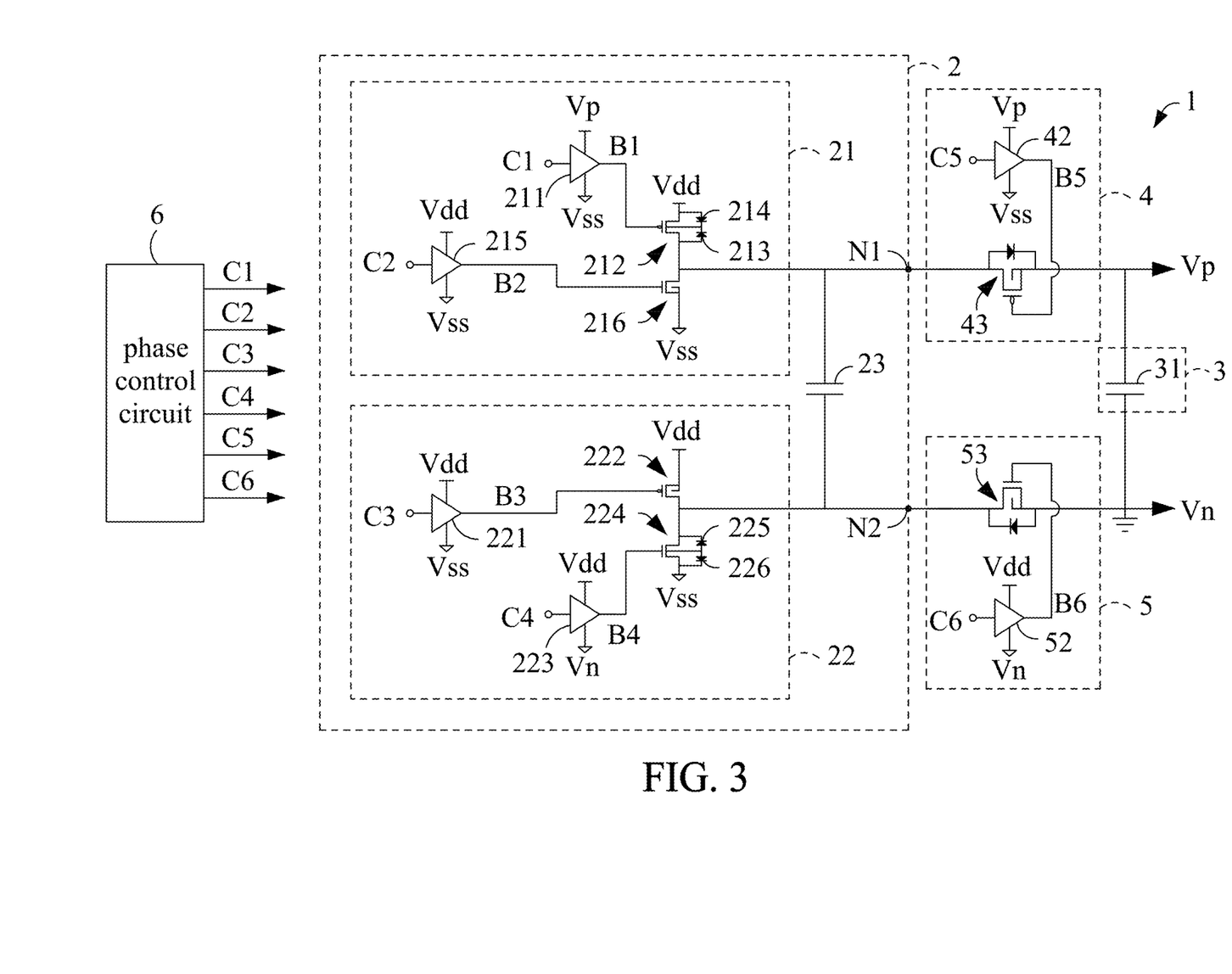
FIG. 3 is a circuit block diagram of another aspect of the first output unit and the second output unit according to the embodiment of the disclosure.

Referring to FIG. 3, there is shown a circuit block diagram of another aspect of the first output unit 4 and the second output unit 5 of the charge pump device 1 according to the embodiment of the disclosure. In this embodiment, the phase control circuit 6 is further coupled to the first output unit 4 and the second output unit 5 and adapted to generate a fifth control signal C5 and a sixth control signal C6 to be outputted to the first output unit 4 and the second output unit 5 respectively to control the ON state and OFF state of transistors (described in detail below) inside the first output unit 4 and the second output unit 5.

In this embodiment, the first output unit 4 comprises a fifth buffer gate 42 and a fifth transistor 43.

The fifth buffer gate 42 has a first end for receiving the fifth control signal C5, a second end for receiving the positive pump voltage Vp, a third end for receiving the reference voltage Vss, and a fifth buffer output terminal. The fifth buffer gate 42 generates a fifth buffer signal B5 at the fifth buffer output terminal according to the fifth control signal C5, the positive pump voltage Vp and the reference voltage Vss.

The fifth transistor 43 has a first end coupled to the first node N1 to receive the first voltage adjustment output V1, a second end coupled to the first output terminal of the output capacitor unit 3, and a control end coupled to the fifth buffer output terminal to receive the fifth buffer signal B5. The fifth transistor 43 is controlled by the fifth buffer signal B5 to turn ON or OFF.

In this embodiment, the second output unit 5 comprises a sixth buffer gate 52 and a sixth transistor 53.

The sixth buffer gate 52 has a first end for receiving the sixth control signal C6, a second end for receiving the power supply voltage Vdd, a third end for receiving the negative pump voltage Vn, and a sixth buffer output terminal. The sixth buffer gate 52 generates a sixth buffer signal B6 at the sixth buffer output terminal according to the sixth control signal C6, the power supply voltage Vdd and the negative pump voltage Vn.

The sixth transistor 53 has a first end coupled to the second node N2 to receive the second voltage adjustment output V2, a second end coupled to the second output terminal of the output capacitor unit 3, and a control end coupled to the sixth buffer output terminal to receive the sixth buffer signal B6. The sixth transistor 53 is controlled by the sixth buffer signal B6 to turn ON or OFF.

Figure 4:
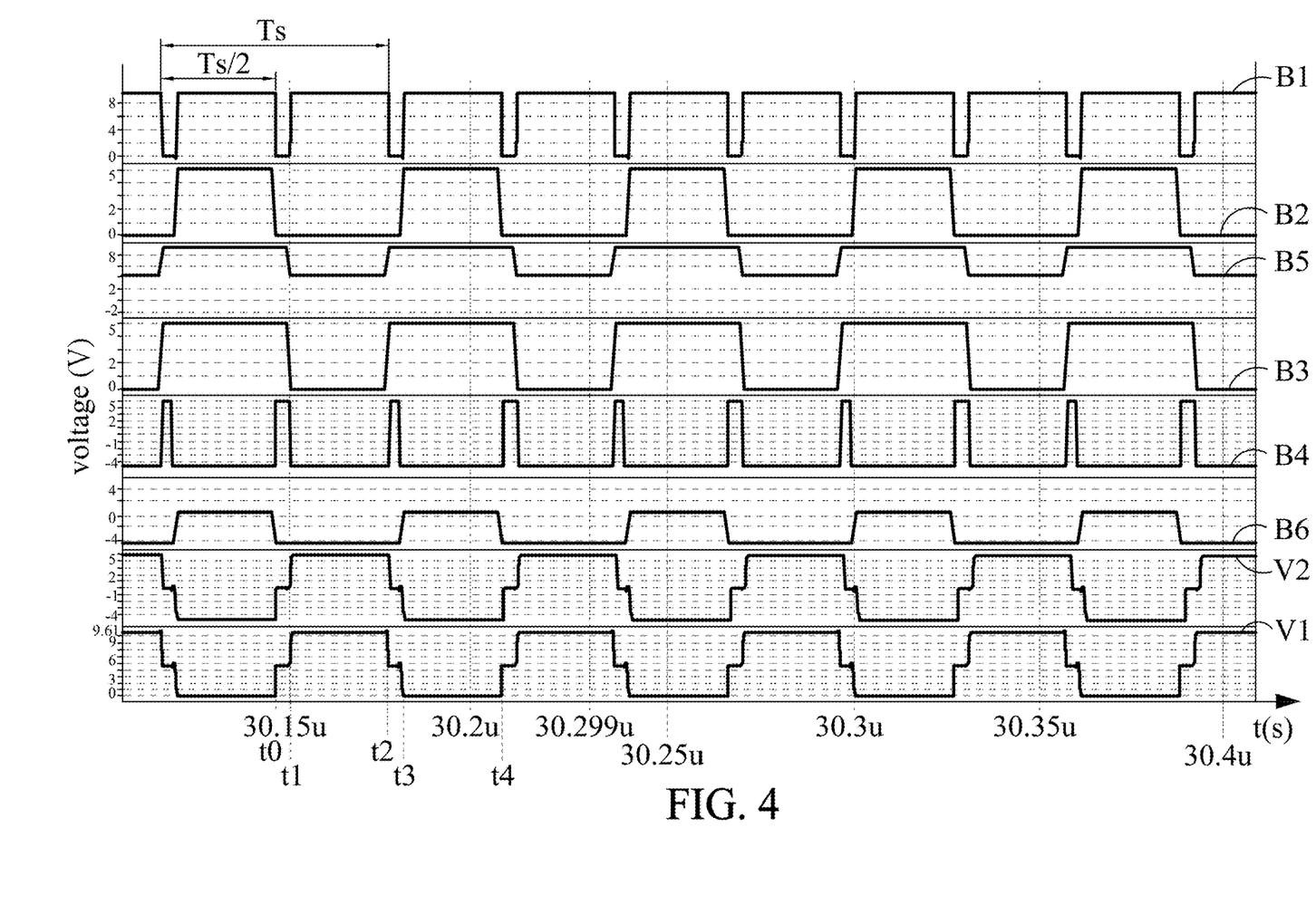
FIG. 4 is a timing diagram of the operation of the embodiment.

Referring to FIG. 4, there is shown a timing diagram of the operation of the charge pump device 1 in the embodiment illustrated by FIG. 3. B1~B6 denote the first through sixth buffer signals respectively. Ts denotes a switching cycle of the first control signal C1. V1, V2 denote the first and second voltage adjustment outputs respectively, whereas t denotes time, and t0~t4 denote points in time. The operation principle of the charge pump device in the embodiment illustrated by FIG. 2 is similar to the operation principle of the charge pump device in the embodiment illustrated by FIG. 3; thus, the description of the operation of the charge pump device 1 of the disclosure is based on FIG. 3 for an exemplary purpose.

Referring to FIG. 3 and FIG. 4, the charge pump device 1 in this embodiment cyclically operates in the first through fourth stages. In this embodiment, the first stage and the second stage are dedicated to the voltage pumping operation performed by the voltage adjustment unit 2, whereas the third stage and the fourth stage are dedicated to the voltage reducing operation performed by the voltage adjustment unit 2. The flying capacitor 23 has a cross-voltage of 5V. The reference voltage Vss is a grounded voltage. The power supply voltage Vdd has a voltage level of 5V for exemplary sake, but the disclosure is not limited thereto. The first through fourth stages are described below.

First Stage (Points in Time: t0~t1):

The first stage is a precharging stage (Precharge+) in which the first transistor 212 and the fourth transistor 224 turn ON, the second transistor 212 turns OFF, the third transistor 222 remains OFF, and the fifth transistor 43 and the sixth transistor 53 turn OFF. At this point in time, the voltage level of the first voltage adjustment output V1 increases from 0V to around 5V, and the voltage level of the second voltage adjustment output V2 increases from −5V to 0V, allowing the flying capacitor 23 to perform charging according to the first voltage adjustment output V1.

Second Stage (Points in Time: t1~t2):

The second stage is a voltage pumping stage (Pump+) in which the first transistor 212 and the fourth transistor 224 turn OFF, the second transistor 212 remains OFF, the third transistor 222 and the fifth transistor 43 turn ON, and the sixth transistor 53 remains OFF. At this point in time, the voltage level of the second voltage adjustment output V2 increases from 0V to 5V so as for the voltage level of the first voltage adjustment output V1 to increase from around 5V to around 10V (i.e., V1≈2×(Vdd−Vss)+Vss) and the flying capacitor 23 to store the first voltage adjustment output V1. Since the fifth transistor 43 turns ON, the first voltage adjustment output V1 charges the output capacitor unit 3 through the fifth transistor 43, causing the first output terminal of the output capacitor unit 3 to generate the positive pump voltage Vp. At this point in time, the voltage level of the positive pump voltage Vp is equal to the voltage level of the first voltage adjustment output V1, i.e., around 10V (i.e., Vp=V1≈2×(Vdd−Vss)+Vss). In this embodiment, the positive pump voltage Vp acquired by the charge pump device 1 after undergoing voltage pumping is around two times the power supply voltage Vdd.

Third Stage (Points in Time: t2~t3):

The third stage is a predischarging stage (Precharge−) in which the first transistor 212 and the fourth transistor 224 turn ON, the second transistor 212 remains OFF, the third transistor 222 and the fifth transistor 43 turn OFF, and the sixth transistor 53 remains OFF. At this point in time, the voltage level of the second voltage adjustment output V2 decreases from 5V to 0V, and the voltage level of the first voltage adjustment output V1 decreases from around 10V to around 5V.

Fourth Stage (Points in Time: t3~t4):

The fourth stage is a voltage reducing stage (Pump−) in which the first transistor 212 and the fourth transistor 224 turn OFF, the second transistor 212 turns ON, the third transistor 222 and the fifth transistor 43 remain OFF, and the sixth transistor 53 turns ON. At this point in time, the voltage level of the first voltage adjustment output V1 decreases from around 5V to 0V, the voltage level of the second voltage adjustment output V2 decreases from 0V to around −5V (i.e., V2≈Vss−(Vdd−Vss)), and the flying capacitor 23 stores the second voltage adjustment output V2. Since the sixth transistor 53 is ON, the second voltage adjustment output V2 charges the output capacitor unit 3 through the sixth transistor 53, causing the second output terminal of the output capacitor unit 3 to generate the negative pump voltage Vn. At this point in time, the voltage level of the negative pump voltage Vn is equal to the voltage level of the second voltage adjustment output V2 and is substantially equal to −5V (i.e., Vn=V2≈Vss−(Vdd−Vss)). In this embodiment, the negative pump voltage Vn acquired by the charge pump device 1 after undergoing voltage reduction is around the reverse power supply voltage Vdd.

Thus, in this embodiment, the primary charge pump device 1 generates an output voltage that is around three times the power supply voltage Vdd, i.e., 2Vdd~−Vdd. Therefore, given a power supply voltage Vdd of 2.7V~4.2V, this embodiment requires only two charge pump devices 1 (i.e., two secondary charge pump devices) in order to supply power to a 18V system, minimizing the incurred manufacturing cost when compared with a conventional tertiary charge pump device.

Figure 5:
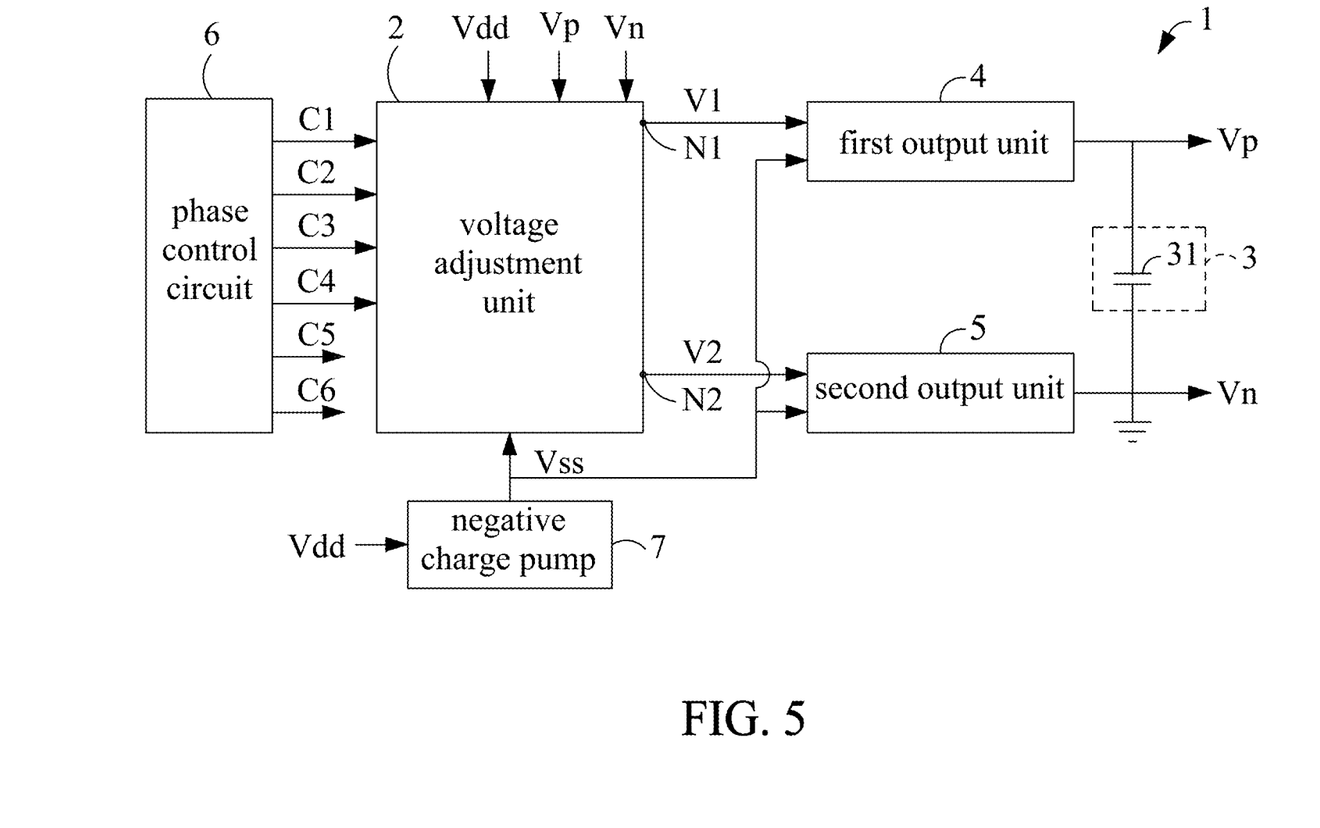
FIG. 5 is a circuit block diagram of the charge pump device according to another embodiment of the disclosure.

FIG. 5 depicts another embodiment of the charge pump device 1. Unlike FIG. 3, FIG. 5 shows that the charge pump device 1 further comprises a negative charge pump 7. The negative charge pump 7 is a primary charge pump. The voltage adjustment unit 2, the output capacitor unit 3, the first output unit 4, the second output unit 5 and the phase control circuit 6 together constitute a secondary charge pump, and thus the charge pump device 1 becomes a secondary charge pump device. The negative charge pump 7 is a DC-to-DC converter. The configuration and operation of the negative charge pump 7 is well known among persons skilled in the art and thus is, for the sake of brevity, not reiterated.

The negative charge pump 7 is coupled to the voltage adjustment unit 2, the first output unit 4 and the second output unit 5, generates the reference voltage Vss according to the power supply voltage Vdd, and outputs the reference voltage Vss to the voltage adjustment unit 2, the first output unit 4 and the second output unit 5. In this embodiment, the reference voltage Vss is the reverse power supply voltage Vdd (i.e., Vss=−Vdd). The positive pump voltage Vp is equal to the first voltage adjustment output V1 and thereby is substantially equal to 2×(Vdd−Vss)+Vss, and thus the positive pump voltage Vp acquired by the charge pump device 1 in this embodiment after voltage pumping is around three times the power supply voltage Vdd, i.e., Vp≈2×(Vdd−Vss)+Vss=2×[Vdd−(−Vdd)]+(−Vdd)=3Vdd. The voltage level of the negative pump voltage Vn is equal to the voltage level of the second voltage adjustment output V2 and thus is substantially equal to Vss-(Vdd-Vss); thus, the negative pump voltage Vn acquired by the charge pump device 1 in this embodiment after voltage reducing is around three times the reverse power supply voltage Vdd, i.e., Vn≈Vss−(Vdd−Vss)=(−Vdd)−[Vdd−(−Vdd)]=−3Vdd. Therefore, the output voltage generated by the charge pump device 1 in this embodiment is substantially equal to six times the power supply voltage Vdd (i.e., +3Vdd).

A combination of the charge pump device 1 shown in FIG. 1 and the negative charge pump 7 shown in FIG. 5 can vary in terms of quantity to generate an output voltage and its multiples. For instance, two charge pump devices 1 of FIG. 1 are connected in series to form a secondary charge pump device for generating an output voltage that is nine (3×3) times greater. The charge pump device 1 of FIG. 1 and the negative charge pump 7 are connected in series to form a secondary charge pump device for generating an output voltage that is six (3×2) times greater. Three charge pump devices 1 of FIG. 1 are connected in series to form a tertiary charge pump device for generating an output voltage that is 27 (3×3×3) times greater. Two charge pump devices 1 of FIG. 1 and one negative charge pump 7 are connected in series to form a tertiary charge pump device for generating an output voltage that is 18 (3×3×2) times greater. One charge pump device 1 of FIG. 1 and two negative charge pumps 7 are connected in series to form a tertiary charge pump device for generating an output voltage that is 12 (3×2×2) times greater, but the disclosure is not limited thereto. Thus, this disclosure provides a novel charge-discharging path effective in reducing the required order number of the charge pumps of the charge pump devices in a combination. Thus, when power is supplied through the charge pump device, the number of the charge pump devices 1 of FIG. 1 or the negative charge pumps 7 in a combination can be selectively determined according to the magnitude of the electric power required for a succeeding circuit; thus, not only can the charge pumps in the least possible number be sufficient to boost voltage to reduce circuit area and cut manufacturing cost, but the output voltage of the charge pump devices in a combination is also effective in turning ON circuit components of the succeeding circuit even though the circuit components can otherwise be turned ON only under a high voltage.

Figure 6:
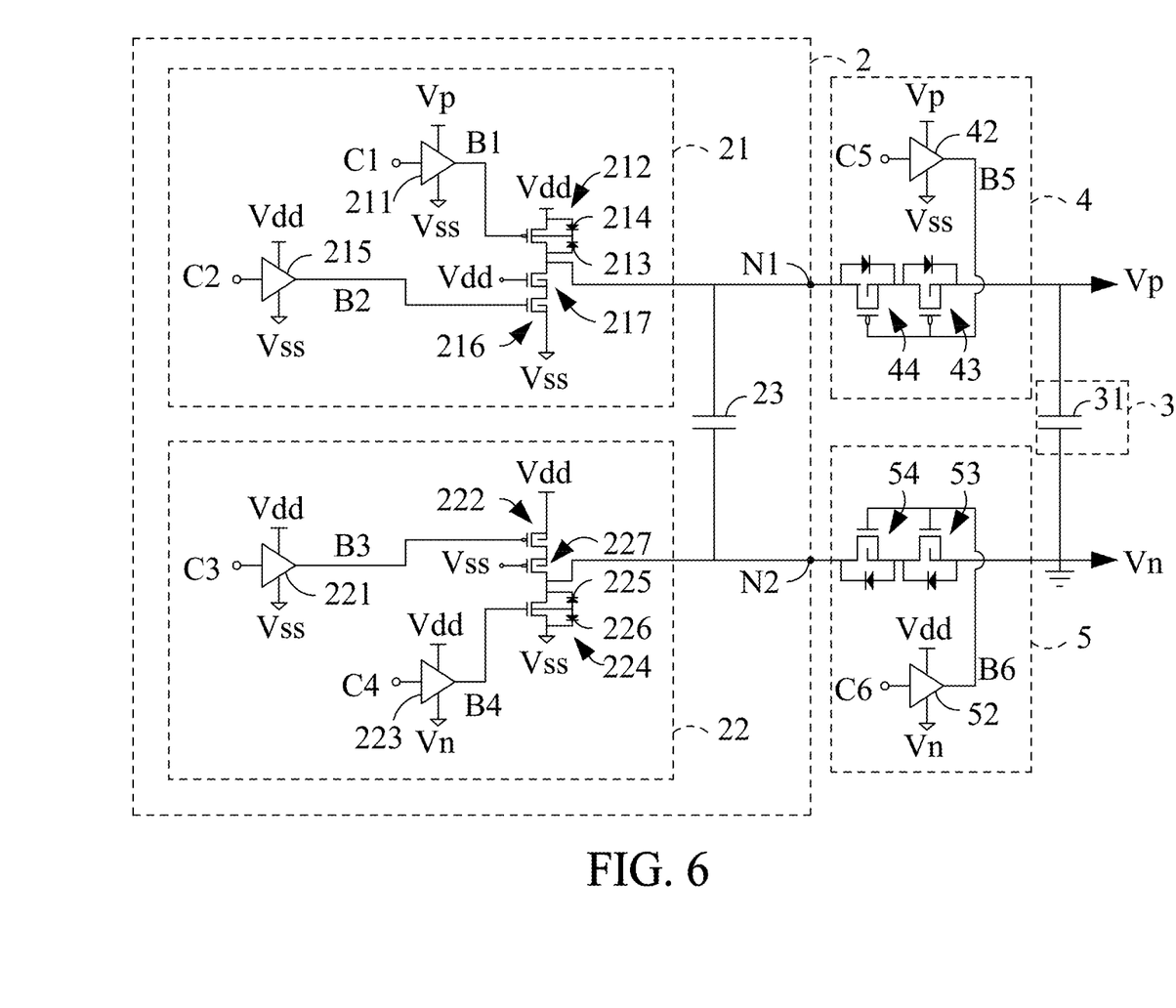
FIG. 6 is a circuit diagram of another aspect of the voltage adjustment unit according to the embodiment of the disclosure and yet another aspect of the first output unit and the second output unit according to the embodiment of the disclosure.

Referring to FIG. 6, there is shown a circuit diagram of another aspect of the voltage adjustment unit 2 of the charge pump device 1 according to the embodiment of the disclosure and yet another aspect of the first output unit 4 and the second output unit 5 according to the embodiment of the disclosure. Unlike FIG. 3, FIG. 6 shows that the first switch circuit 21 further comprises a first voltage-dividing transistor 217, the second switch circuit 22 further comprises a second voltage-dividing transistor 227, the first output unit 4 further comprises a third voltage-dividing transistor 44, and the second output unit 5 further comprises a fourth voltage-dividing transistor 54.

The first voltage-dividing transistor 217 has a first end coupled to the second end of the first transistor 212, a second end coupled to the first end of the second transistor 216, and a control end for receiving the power supply voltage Vdd. The first voltage-dividing transistor 217 is controlled by the power supply voltage Vdd to turn ON or OFF.

The second voltage-dividing transistor 227 has a first end coupled to the second end of the third transistor 222, a second end coupled to the first end of the fourth transistor 224, and a control end for receiving the reference voltage Vss. The second voltage-dividing transistor 227 is controlled by the reference voltage Vss to turn ON or OFF.

The third voltage-dividing transistor 44 has a first end coupled to the first node N1 to receive the first voltage adjustment output V1, a second end coupled to the first end of the fifth transistor 43, and a control end coupled to the fifth buffer output terminal to receive the fifth buffer signal B5. The third voltage-dividing transistor 44 is controlled by the fifth buffer signal B5 to turn ON or OFF.

The fourth voltage-dividing transistor 54 has a first end coupled to the second node N2 to receive the second voltage adjustment output V2, a second end coupled to the first end of the sixth transistor 53, and a control end coupled to the sixth buffer output terminal to receive the sixth buffer signal B6. The fourth voltage-dividing transistor 54 is controlled by the sixth buffer signal B6 to turn ON or OFF.

The first voltage-dividing transistor 217 and the fourth voltage-dividing transistor 54 are each an N-type MOSFET whose drain, source and gate are the first end, second end and control end of each of the first voltage-dividing transistor 217 and the fourth voltage-dividing transistor 54 respectively. The second voltage-dividing transistor 227 and the third voltage-dividing transistor 44 are each a P-type MOSFET whose source, drain and gate are the first end, second end and control end of each of the second voltage-dividing transistor 227 and the third voltage-dividing transistor 44 respectively. In this embodiment, the power supply voltage Vdd has a voltage level of 5V, for example. When the charge pump device 1 performs the voltage pumping operation, the first through fourth voltage-dividing transistors 217, 227, 44, 54 perform voltage division to achieve a transistor cross-voltage of 5V in the voltage adjustment unit 2, the first output unit 4 and the second output unit 5 shown in FIG. 6; thus, in this embodiment, the charge pump device 1 is a pure 5V system suitable for being manufactured by a 5V manufacturing process that incurs lower cost than a 15V manufacturing process.

Figure 7:
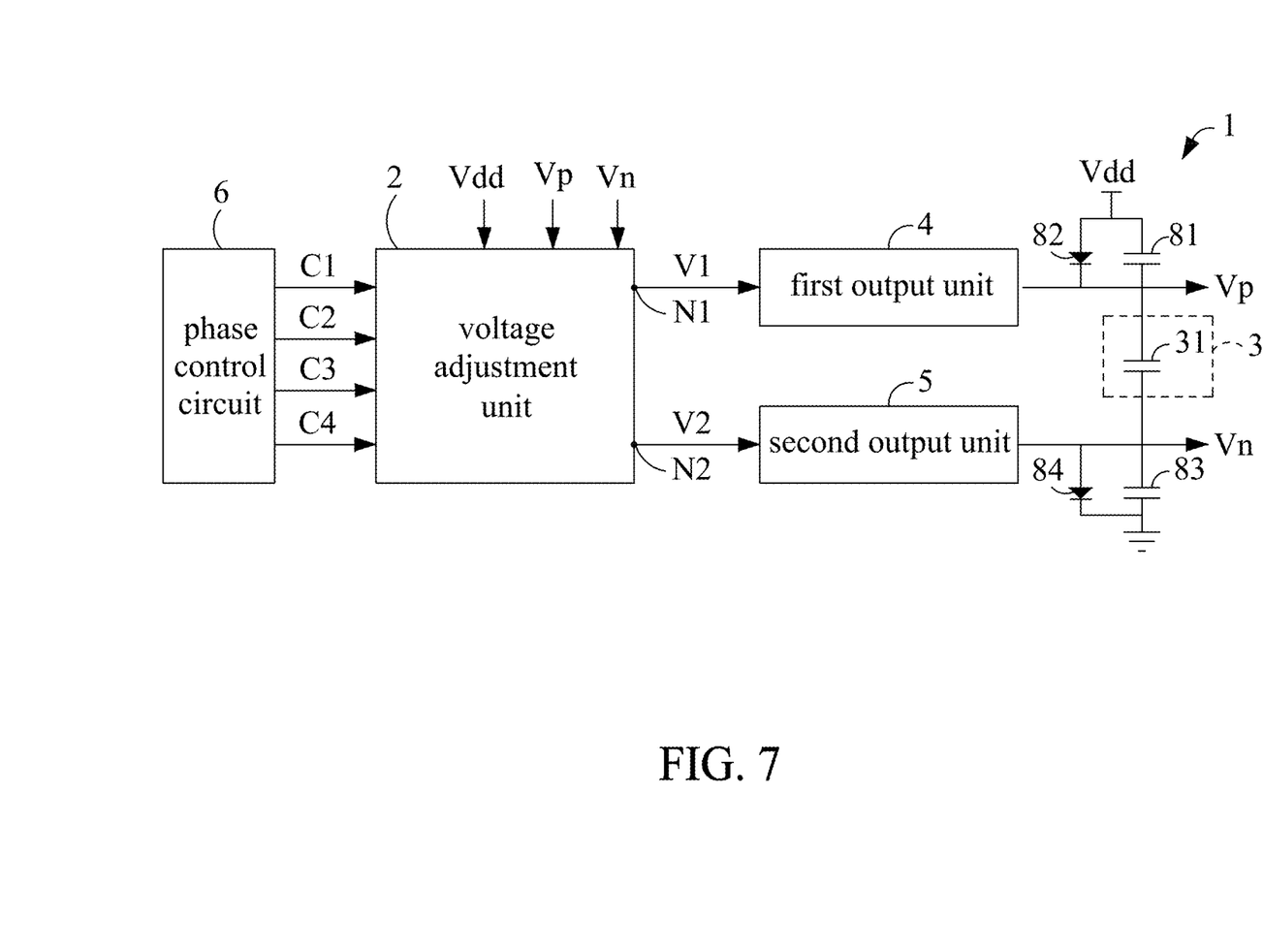
FIG. 7 is a circuit block diagram of the charge pump device according to yet another embodiment of the disclosure.

Referring to FIG. 7, there is shown a circuit block diagram of the charge pump device 1 according to yet another embodiment of the disclosure. Unlike FIG. 1, FIG. 7 shows that the charge pump device 1 further comprises a first voltage-stabilizing capacitor 81, a third diode 82, a second voltage-stabilizing capacitor 83 and a fourth diode 84.

The first voltage-stabilizing capacitor 81 has a first end for receiving the power supply voltage Vdd and a second end coupled to the first output terminal of the output capacitor unit 3. The third diode 82 has an anode for receiving the power supply voltage Vdd and a cathode coupled to the first output terminal of the output capacitor unit 3. The second voltage-stabilizing capacitor 83 has a first end coupled to the second output terminal of the output capacitor unit 3 and a grounded second end. The fourth diode 84 has an anode coupled to the second output terminal of the output capacitor unit 3 and a grounded cathode. Since the charging and discharging of the output capacitor unit 3 cause ripples to the output voltage of the charge pump device 1. Therefore, this embodiment is effective in allowing the first voltage-stabilizing capacitor 81 and the second voltage-stabilizing capacitor 83 to perform voltage stabilization conducive to the reduction of ripples of the output voltage of the charge pump device 1, further stabilizing the output voltage.

The charge pump device 1 of the disclosure has advantages described below. The first through sixth control signals C1~C6 control transistors to turn ON and OFF respectively and thereby cause the charge pump device 1 to generate the positive pump voltage Vp or the negative pump voltage Vn, not only enhancing the flexibility of the charge pump device 1, but also requiring just one output capacitor unit 3 and one flying capacitor 23. Therefore, the charge pump device 1 has the minimal required circuit area, incurs minimal manufacturing cost, and has the minimal required number of output pins. By contrast, every conventional charge pump device has to be equipped with a positive charge pump and a negative charge pump and comprises multiple flying capacitors and multiple output capacitor units, requiring large circuit area, incurring high manufacturing cost, requiring a large number of output pins.

The invention is disclosed above by embodiments. The embodiments are illustrative of the invention but shall not be interpreted as restrictive of the scope of the embodiments of the invention. Thus, all simple equivalent variations and modifications made to the aforesaid embodiments according to the claims and detailed description of the invention shall be deemed falling within the scope of the claims of the invention.

What is claimed is:

1. A charge pump device, comprising:
a voltage adjustment unit having a first node and a second node and adapted to receive a power supply voltage, a first control signal, a second control signal, a third control signal, a fourth control signal, a positive pump voltage and a negative pump voltage and perform a voltage pumping operation or a voltage reducing operation on the power supply voltage according to the first through fourth control signals, the positive pump voltage and the negative pump voltage to generate a first voltage adjustment output at the first node and generate a second voltage adjustment output at the second node;
an output capacitor unit having a first output terminal and a second output terminal;
a first output unit coupled between the first node and the first output terminal, wherein, when the first output unit is ON, the first voltage adjustment output charges the output capacitor unit through the first output unit, causing the first output terminal of the output capacitor unit to generate the positive pump voltage; and
a second output unit coupled between the second node and the second output terminal, wherein, when the second output unit is ON, the second voltage adjustment output charges the output capacitor unit through the second output unit, causing the second output terminal of the output capacitor unit to generate the negative pump voltage, wherein the second output unit is OFF when the first output unit is ON, and the first output unit is OFF when the second output unit is ON.

2. The charge pump device of claim 1, wherein the voltage adjustment unit comprises:
- a first switch circuit adapted to receive the power supply voltage, the first control signal, the second control signal and the positive pump voltage and coupled to the first node to perform switching according to the first control signal, the second control signal and the positive pump voltage to perform the voltage pumping operation or the voltage reducing operation, so as to generate the first voltage adjustment output at the first node;
- a second switch circuit adapted to receive the power supply voltage, the third control signal, the fourth control signal and the negative pump voltage and coupled to the second node to perform switching according to the third control signal, the fourth control signal and the negative pump voltage to perform the voltage pumping operation or the voltage reducing operation, so as to generate the second voltage adjustment output at the second node; and
- a flying capacitor coupled between the first node and the second node to perform charging according to one of the first voltage adjustment output and the second voltage adjustment output.

3. The charge pump device of claim 2, wherein the voltage pumping operation comprises a precharging stage and a voltage pumping stage, whereas the voltage reducing operation comprises a predischarging stage and a voltage reducing stage, wherein the first switch circuit comprises:
- a first buffer gate having a first end for receiving the first control signal, a second end for receiving the positive pump voltage, a third end for receiving a reference voltage, and a first buffer output terminal and adapted to generate a first buffer signal at the first buffer output terminal according to the first control signal, the positive pump voltage and the reference voltage;
- a first transistor having a first end for receiving the power supply voltage, a second end coupled to the first node, and a control end coupled to the first buffer output terminal to receive the first buffer signal so as for the first transistor to be controlled by the first buffer signal to turn ON or OFF;
- a first parasitic diode and a first diode, coupled between the first end and the second end of the first transistor, the first parasitic diode having a cathode coupled to a cathode of the first diode and having an anode coupled to the second end of the first transistor, and the first diode having an anode coupled to the first end of the first transistor;
- a second buffer gate having a first end for receiving the second control signal, a second end for receiving the power supply voltage, a third end for receiving the reference voltage, and a second buffer output terminal and adapted to generate a second buffer signal at the second buffer output terminal according to the second control signal, the power supply voltage and the reference voltage; and
- a second transistor having a first end coupled to the second end of the first transistor, a second end for receiving the reference voltage, and a control end coupled to the second buffer output terminal to receive the second buffer signal so as for the second transistor to be controlled by the second buffer signal to turn ON or OFF, wherein, in the precharging stage, the first transistor is ON, whereas the second transistor, the first output unit and the second output unit are OFF, wherein, in the voltage pumping stage, the first transistor, the second transistor and the second output unit are OFF, whereas the first output unit is ON, wherein, in the predischarging stage, the first transistor is ON, whereas the second transistor, the first output unit and the second output unit are OFF; and wherein, in the voltage reducing stage, the first transistor and the first output unit are OFF, whereas the second transistor and the second output unit are ON.

4. The charge pump device of claim 3, wherein the first switch circuit further comprises a first voltage-dividing transistor having a first end coupled to the second end of the first transistor, a second end coupled to the first end of the second transistor, and a control end for receiving the power supply voltage so as for the first voltage-dividing transistor to be controlled by the power supply voltage to turn ON or OFF.

5. The charge pump device of claim 4, wherein the first transistor is a P-type MOSFET, whereas the second transistor and the first voltage-dividing transistor are each an N-type MOSFET.

6. The charge pump device of claim 2, wherein the voltage pumping operation comprises a precharging stage and a voltage pumping stage, whereas the voltage reducing operation comprises a predischarging stage and a voltage reducing stage, wherein the second switch circuit comprises:
- a third buffer gate having a first end for receiving the third control signal, a second end for receiving the power supply voltage, a third end for receiving the reference voltage, and a third buffer output terminal and adapted to generate a third buffer signal at the third buffer output terminal according to the third control signal, the power supply voltage and the reference voltage;
- a third transistor having a first end for receiving the power supply voltage, a second end coupled to the second node, and a control end coupled to the third buffer output terminal to receive the third buffer signal so as for the third transistor to be controlled by the third buffer signal to turn ON or OFF;
- a fourth buffer gate having a first end for receiving the fourth control signal, a second end for receiving the power supply voltage, a third end for receiving the negative pump voltage, and a fourth buffer output terminal and adapted to generate a fourth buffer signal at the fourth buffer output terminal according to the fourth control signal, the power supply voltage and the negative pump voltage;
- a fourth transistor having a first end coupled to the second end of the third transistor, a second end for receiving the reference voltage, and a control end coupled to the fourth buffer output terminal to receive the fourth buffer signal so as for the fourth transistor to be controlled by the fourth buffer signal to turn ON or OFF; and
- a second parasitic diode and a second diode, coupled between the first end and the second end of the fourth transistor, the second parasitic diode having an anode coupled to an anode of the second diode and having a cathode coupled to the first end of the fourth transistor, and the second diode having a cathode coupled to the second end of the fourth transistor, wherein, in the precharging stage, the fourth transistor is ON, whereas the third transistor, the first output unit and the second output unit are OFF, wherein, in the voltage pumping stage, the fourth transistor and the second output unit are OFF, whereas the third transistor and the first output unit are ON, wherein, in the predischarging stage, the fourth transistor is ON, whereas the third transistor, the first output unit and the second output unit are OFF, and wherein, in the voltage reducing stage, the fourth transistor, the third transistor and the first output unit are OFF, whereas the second output unit is ON.

7. The charge pump device of claim 6, wherein the second switch circuit further comprises a second voltage-dividing transistor having a first end coupled to the second end of the third transistor, a second end coupled to the first end of the fourth transistor, and a control end for receiving the reference voltage so as for the second voltage-dividing transistor to be controlled by the reference voltage to turn ON or OFF.

8. The charge pump device of claim 7, wherein the third transistor and the second voltage-dividing transistor are each a P-type MOSFET, and the fourth transistor is an N-type MOSFET.

9. The charge pump device of claim 3, wherein, when the reference voltage is a grounded voltage, the positive pump voltage is around two times the power supply voltage, and the negative pump voltage is substantially a reverse power supply voltage.

10. The charge pump device of claim 3, further comprising a negative charge pump coupled to the voltage adjustment unit, the first output unit and the second output unit to generate the reference voltage according to the power supply voltage and output the reference voltage to the voltage adjustment unit, the first output unit and the second output unit, with the reference voltage being a reverse power supply voltage, allowing the positive pump voltage to be around three times the power supply voltage, and allowing the negative pump voltage to be around three times the reverse power supply voltage.

11. The charge pump device of claim 1, wherein the first output unit selectively turns ON according to the first voltage adjustment output and comprises a first output diode having an anode coupled to the first node to receive the first voltage adjustment output and a cathode coupled to the first output terminal of the output capacitor unit.

12. The charge pump device of claim 1, wherein the first output unit comprises:
a fifth buffer gate having a first end for receiving a fifth control signal, a second end for receiving the positive pump voltage, a third end for receiving a reference voltage, and a fifth buffer output terminal and adapted to generate a fifth buffer signal at the fifth buffer output terminal according to the fifth control signal, the positive pump voltage and the reference voltage; and
a fifth transistor having a first end coupled to the first node to receive the first voltage adjustment output, a second end coupled to the first output terminal of the output capacitor unit, and a control end coupled to the fifth buffer output terminal to receive the fifth buffer signal so as for the fifth transistor to be controlled by the fifth buffer signal to turn ON or OFF.

13. The charge pump device of claim 12, wherein the first output unit further comprises a third voltage-dividing transistor having a first end coupled to the first node to receive the first voltage adjustment output, a second end coupled to the first end of the fifth transistor, and a control end coupled to the fifth buffer output terminal to receive the fifth buffer signal so as for the third voltage-dividing transistor to be controlled by the fifth buffer signal to turn ON or OFF.

14. The charge pump device of claim 13, wherein the fifth transistor and the third voltage-dividing transistor are each a P-type MOSFET.

15. The charge pump device of claim 1, wherein the second output unit selectively turns ON according to the second voltage adjustment output and comprises a second output diode having an anode coupled to the second node to receive the second voltage adjustment output and a cathode coupled to the second output terminal of the output capacitor unit.

16. The charge pump device of claim 1, wherein the second output unit comprises:
a sixth buffer gate having a first end for receiving a sixth control signal, a second end for receiving the power supply voltage, a third end for receiving the negative pump voltage, and a sixth buffer output terminal and adapted to generate a sixth buffer signal at the sixth buffer output terminal according to the sixth control signal, the power supply voltage and the negative pump voltage; and
a sixth transistor having a first end coupled to the second node to receive the second voltage adjustment output, a second end coupled to the second output terminal of the output capacitor unit, and a control end coupled to the sixth buffer output terminal to receive the sixth buffer signal so as for the sixth transistor to be controlled by the sixth buffer signal to turn ON or OFF.

17. The charge pump device of claim 16, wherein the second output unit further comprises a fourth voltage-dividing transistor having a first end coupled to the second node to receive the second voltage adjustment output, a second end coupled to the first end of the sixth transistor, and a control end coupled to the sixth buffer output terminal to receive the sixth buffer signal so as for the fourth voltage-dividing transistor to be controlled by the sixth buffer signal to turn ON or OFF.

18. The charge pump device of claim 17, wherein the sixth transistor and the fourth voltage-dividing transistor are each an N-type MOSFET.

19. The charge pump device of claim 1, further comprising a phase control circuit coupled to the voltage adjustment unit to generate the first through fourth control signals and output the first through fourth control signals to the voltage adjustment unit.

20. The charge pump device of claim 1, further comprising:
a first voltage-stabilizing capacitor having a first end for receiving the power supply voltage and a second end coupled to the first output terminal of the output capacitor unit;
a third diode having an anode for receiving the power supply voltage and a cathode coupled to the first output terminal of the output capacitor unit;
a second voltage-stabilizing capacitor having a first end coupled to the second output terminal of the output capacitor unit and a grounded second end; and
a fourth diode having an anode coupled to the second output terminal of the output capacitor unit and a grounded cathode.

* * * * *